(12) United States Patent
Kaneko

(10) Patent No.: US 8,842,254 B2
(45) Date of Patent: Sep. 23, 2014

(54) LIQUID CRYSTAL DISPLAY PANEL AND MANUFACTURING METHOD FOR THE SAME

(75) Inventor: Hideki Kaneko, Tottori (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 280 days.

(21) Appl. No.: 12/972,018

(22) Filed: Dec. 17, 2010

(65) Prior Publication Data

US 2012/0154734 A1 Jun. 21, 2012

(51) Int. Cl.
*G02F 1/13* (2006.01)
*G02F 1/1333* (2006.01)

(52) U.S. Cl.
USPC .......................... 349/187; 349/158

(58) Field of Classification Search
CPC ................................ G02F 1/133351
USPC .................................. 349/158, 187
See application file for complete search history.

(56) References Cited

U.S. PATENT DOCUMENTS

| 7,907,246 | B2 * | 3/2011 | Onishi et al. ................. 349/153 |
| 8,325,319 | B2 * | 12/2012 | Ikeguchi ....................... 349/190 |
| 2003/0137630 | A1 * | 7/2003 | Niiya ............................. 349/153 |
| 2009/0002619 | A1 * | 1/2009 | Kanai et al. ................... 349/129 |
| 2009/0268130 | A1 * | 10/2009 | Yeh et al. ........................ 349/73 |
| 2009/0316081 | A1 * | 12/2009 | Nishida et al. ................. 349/73 |

FOREIGN PATENT DOCUMENTS

| JP | 10-104561 | 4/1998 |
| JP | 10-325951 | 12/1998 |
| JP | 2004-035950 | 2/2004 |
| JP | 2006-003561 | 1/2006 |
| JP | 2006-343735 | 12/2006 |
| JP | 2007-223855 | 9/2007 |
| JP | 2008-039866 | 2/2008 |

OTHER PUBLICATIONS

Office Action issued Nov. 20, 2012 in corresponding Japanese Application No. 2008-153748.

\* cited by examiner

*Primary Examiner* — Dennis Y Kim
(74) *Attorney, Agent, or Firm* — K&L Gates LLP

(57) ABSTRACT

A liquid crystal display panel is provided and includes a first substrate and a second substrate disposed to face each other with a liquid crystal layer held therebetween. The first substrate has peripheral circuit wires formed in a peripheral area surrounding a display area, and the second substrate is disposed to face the first substrate so that the peripheral circuit wires of the first substrate are exposed. A resin layer having a predetermined width is formed on that end part of the second substrate on the side of facing the first substrate which is located on the side of the peripheral circuit wires of the first substrate.

5 Claims, 8 Drawing Sheets

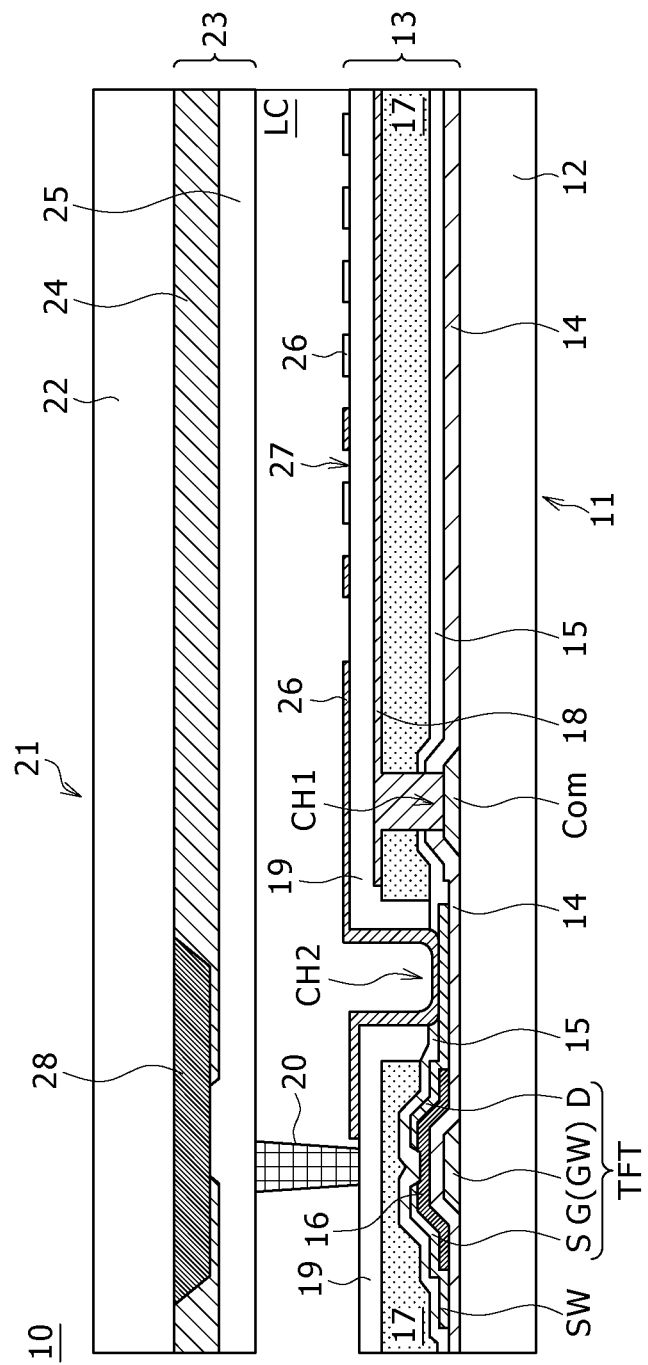

LIQUID CRYSTAL DISPLAY PANEL AND MANUFACTURING METHOD FOR THE SAME

BACKGROUND

The present disclosure relates to a liquid crystal display panel and a manufacturing method therefor, particularly to a liquid crystal display panel provided with a countermeasure against breaking of wire in regard of peripheral circuit wires formed in an area of terminals led out from a display area and connected to an external control circuit, and a manufacturing method therefor.

A liquid crystal display panel has a first substrate composed of a glass substrate or the like provided with pixel electrodes and the like in a display area and with peripheral circuit wires in a peripheral area surrounding the display area, and a second substrate composed of a glass substrate or the like provided with a color filter layer and the like which is disposed to face the first substrate. Besides, the liquid crystal display panel is manufactured through the steps of coating a peripheral area of either one of the first and second substrates with a seal material in an area exclusive of an area for forming a liquid crystal pouring port, adhering the first and second substrates to each other, pouring a liquid crystal into the space formed between the first and second substrates through the liquid crystal pouring port, sealing off the liquid crystal pouring port with a sealant, and the like steps. For enhancing productivity, the liquid crystal display panel with such a configuration is generally produced by a method in which two large-sized glass substrates, specifically, two so-called mother substrates are adhered to each other, the assembly is divided into individual liquid crystal display panel precursors, and thereafter a part of the second substrate is scribed, thereby exposing peripheral circuit wires provided on the first substrate.

In the step of scribing the second substrate, a cut line is formed at a predetermined position on the second substrate by use of a cutter wheel, and an outside surface of the second substrate corresponding to the cut line is hit with a special-use tool called dividing bar so as to cut off an end material of the second substrate, thereby exposing the peripheral circuit wires. Here, a method of scribing a glass substrate according to the related art will be described referring to FIGS. 8 and 9.

FIG. 8 is a plan view showing a substrate and a protective film before scribing which are disclosed in Japanese Patent Laid-Open No. 2004-035950 (paragraphs [0029] and [0030], FIG. 3) (hereinafter referred to as Patent Document 1). FIG. 9 is an illustration of a method of scribing on a sheet glass disclosed in Japanese Patent Laid-Open No. 2007-223855 (paragraph [0010], FIG. 2) (hereinafter referred to as Patent Document 2).

Patent Document 1 discloses, as shown in FIG. 8, in relation to a scribing treatment of various brittle material substrates such as glass substrates or semiconductor wafers or ceramics for flat panel displays, a scribing method for a brittle material substrate 50 provided with island-like protective films Q near intersections of scribe lines L1 to L6. The scribing method for the brittle material substrate 50 is effective in that a load stress of a cutter wheel at the intersections of the scribe lines L1 to L6 is relaxed by the island-like protective films Q, whereby product defects such as "chipping," "tangling" and "splitting" are restrained from being generated at the intersections.

Besides, Patent Document 2 discloses a dividing method for a sheet glass wherein, as shown in FIG. 9, a scribe line 61 is cut in a planned scribing site of the sheet glass 60 and thereafter splitting scribing is conducted using the scribe line 61 as a reference for splitting. In this sheet glass dividing method, the splitting scribing is conducted after a water-soluble protective film F is preliminarily formed in a partial area inclusive of the planned scribing site of a light-transmitting surface or surfaces on one side or both sides of the sheet glass 60. Specifically, according to the scribing method disclosed in Patent Document 2, the sheet glass 60 is subjected to splitting scribing after the water-soluble protective film F is formed in the partial area inclusive of the planned scribing site of the sheet glass 60. Therefore, there is obtained an effect such that, even when glass chippings generated upon splitting scribing of the sheet glass 60 are deposited on the surface of the sheet glass 60, they can be easily removed by washing with water in a later step.

SUMMARY

Meanwhile, in a liquid crystal display panel, as above-mentioned, it is necessary that, after a pair of first and second substrates are disposed to face each other and adhered to each other, an end material of the second substrate located over peripheral circuit wires of the first substrate should be removed. In this instance, burr has been generated at the corner of the end material of the second substrate preliminarily scribed along the scribe line and the corner of the end material of the second substrate thus scribed collides against the peripheral circuit wires, so that the peripheral circuit wires may be damaged, possibly resulting in breaking of wire. This phenomenon will be described referring to FIGS. 10A and 10B.

FIG. 10A is a sectional view for illustrating a scribing step according to the related art, and FIG. 10B is an enlarged view of part XB of FIG. 10A.

A precursor 70 of a liquid crystal display device in the scribing step shown in FIG. 10A has a configuration wherein an array substrate 71 having various electrodes and wires and the like 73 formed on a surface of a first glass substrate 72 and a color filter substrate 74 having a color filter layer and the like 76 formed on a surface of a second glass substrate 75 are disposed to face each other, the outer periphery of the assembly is sealed with a seal material 77, and a liquid crystal is enclosed in the inside of the assembly. Then, after a scribe line S is preliminarily formed at a predetermined position of the second glass substrate 75, the second glass substrate 75 is broken along the scribe line S by a dividing bar 78, whereby an end material 75a of the second glass substrate 75 is cut away, and peripheral circuit wires 73a in a terminal area on the array substrate 71 are exposed. In this instance, as shown in FIG. 10B, a corner of the end material 75a comes into contact with the peripheral circuit wires 73a of the array substrate 71, and a crack(s) CR may be generated in the peripheral circuit wires 73a on the array substrate 71 due to the shock of the contact, resulting in breaking of wire at the peripheral circuit wires 73a.

However, the above-mentioned Patent Documents 1 and 2 are both for solving the problem of chipping or the like generated just in the substrate or sheet glass subjected to the scribing treatment. Therefore, it is impossible, by Patent Documents 1 and 2, to realize a countermeasure against the breaking of wire which may occur at the peripheral circuit wires of the array substrate 71 as above-mentioned.

As a countermeasure against the breaking of wire which may occur at the peripheral circuit wires 73a of the array substrate 71 as above-mentioned, there may be contemplated a method in which a gate insulating film over the peripheral circuit wires 73a is made thicker and a method in which the peripheral circuit wires 73a are covered with an overcoat (OVL) layer. When the gate insulating film is increased in thickness, however, the array substrate 71 would be warped. In addition, since the gate insulating film is hard, breaking may reach the peripheral circuit wires 73a at a stroke under the impact of the contact of the end material 75. Moreover, there is the problem that a change in holding capacity would occur. The method in which the peripheral circuit wires 73a are covered with the OVL layer ensures that the OVL layer softer than the gate insulating film can be formed in a thickness of not less than 2 μm, so that it is possible at least to lessen the possibility of breaking of wire at the peripheral circuit wires 73a of the array substrate 71. Since it is necessary to secure a margin at the time of forming the OVL layer, however, the OVL layer cannot be disposed to range to the glass end face of the array substrate 71. In addition, the OVL layer cannot be disposed to range to a position proximate to a driver mounting area. Accordingly, this method lacks in efficacy.

Accordingly, it is desirable to provide a liquid crystal display panel having a structure such that breaking of wire at peripheral circuit wires led out into a non-display area surrounding a display area is prevented or restrained, thereby enhancing reliability, and a manufacturing method therefor.

According to an embodiment, there is provided a liquid crystal display panel including a first substrate and a second substrate disposed to face each other with a liquid crystal layer held therebetween, the first substrate having peripheral circuit wires formed in a peripheral area surrounding a display area, and the second substrate being disposed to face the first substrate so that the peripheral circuit wires of the first substrate are exposed, wherein a resin layer having a predetermined width is formed on that end part of the second substrate on the side of facing the first substrate which is located on the side of the peripheral circuit wires of the first substrate.

In the related art, at the time of removing the end material of the second substrate located at a position corresponding to the peripheral circuit wires of the first substrate by a scribing treatment, a corner of the end material scribed may collide against the peripheral circuit wire part of the first substrate. Thus, in the related art there has been the risk of breaking of wire at the peripheral circuit wires due to the impact of the collision. However, in the second substrate of the liquid crystal display panel according to an embodiment, the resin layer having a predetermined width is formed on that end part on the side of facing the first substrate which is located on the side of the peripheral circuit wires of the first substrate. The resin layer is softer than a gate insulating film. In addition, the resin layer is formed on the second substrate on the side of facing the first substrate in such a manner as to straddle the scribe line, and, thereafter, the second substrate is scribed along the scribe line, in manufacturing the liquid crystal display panel.

Therefore, in the liquid crystal display panel according to the embodiment, at the time of removing the end material of the second substrate located at a position corresponding to the peripheral circuit wires of the first substrate by the scribing treatment, the resin layer is present at the corner of the end material scribed. This ensures that, even if the corner of the scribed end material collides against the peripheral circuit wire part of the first substrate, the shock of the collision is absorbed by the resin layer. Consequently, according to the liquid crystal display panel of the present embodiment, the possibility of breaking of wire at the peripheral circuit wires of the first substrate is very low, and it is possible to obtain a liquid crystal display panel high in reliability.

Also, in the liquid crystal display panel according to the embodiment, preferably, the resin layer is composed of at least one layer of a material selected from among materials used to form a light-shielding layer, an overcoat layer, a color filter layer, and a photo-spacer.

According to the liquid crystal display panel configured in this manner, the resin layer can be formed from the same material as one of the various layers formed in the production process of the second substrate. Therefore, the resin layer can be formed without adding a special production step. Further, the material to be laminated can be selected arbitrarily, so that the degree of freedom in designing is increased. In this case, a predetermined effect of the resin layer can be exhibited insofar as the resin layer is composed of at least one layer of a material selected from among the materials used to form the light-shielding layer, the overcoat layer, the color filter layer, and the photo-spacer. However, where the resin layer is formed in a multi-layer structure and is enlarged in thickness, the risk of breaking of wire at the peripheral circuit wires of the first substrate is further lowered.

In addition, in the liquid crystal display panel according to the embodiment, preferably, the resin layer is formed in an area exclusive of a scribe mark formed on the second substrate.

According to the liquid crystal display panel configured in this manner, the scribe mark can be visually confirmed, so that the scribe line can be set accurately, and it is possible to obtain a liquid crystal display panel with good dimensional accuracy. Further, the resin layer formed in this case may be small in width.

According to the liquid crystal display panel of the present embodiment, preferably, the resin layer is formed in the form of individual resin layers such as to correspond to the peripheral circuit wires of the first substrate.

According to the liquid crystal display panel configured in this manner, the resin layer is formed in the form of individual resin layers only in the areas where the wires of the first substrate are present. Consequently, the resin material is not used wastefully, and it is possible to obtain a liquid crystal display panel inexpensively.

According to an embodiment, there is also provided a method of manufacturing a liquid crystal display panel, including: preparing a precursor of the liquid crystal display panel which includes a first substrate having peripheral circuit wires formed in a peripheral area surrounding a display area, and a second substrate being disposed to face the first substrate, with a liquid crystal layer held between the first substrate and the second substrate; and scribing the second substrate of the precursor of the liquid crystal display panel along a predetermined scribe line so as to expose the peripheral circuit wires of the first substrate.

In the method, a resin layer is formed on the second substrate on the side of facing the first substrate in such a manner as to straddle the scribe line, and thereafter the second substrate is scribed along the scribe line.

In the method of manufacturing a liquid crystal display panel according to the embodiment, before scribing the end material from the second substrate, the resin layer is formed on the second substrate on the side of facing the first substrate in such a manner as to straddle the scribe line, and, thereafter, the second substrate is scribed along the scribe line. Therefore, according to the method of manufacturing a liquid crystal display panel according to the embodiment, the resin layer is present at the corner of the end material of the second substrate thus scribed. This ensures that, even if the corner of the end material collides against the peripheral circuit wire part of the first substrate, the impact of the collision is absorbed by the resin layer. Consequently, the risk of breaking of wire at the peripheral circuit wires of the first substrate is very low, and it is possible to manufacture a liquid crystal display panel with high reliability.

Additional features and advantages are described herein, and will be apparent from the following Detailed Description and the figures.

BRIEF DESCRIPTION OF THE FIGURES

FIG. 4 is an enlarged sectional view taken along line IV-IV of FIG. 3;

DETAILED DESCRIPTION

Figure 1:
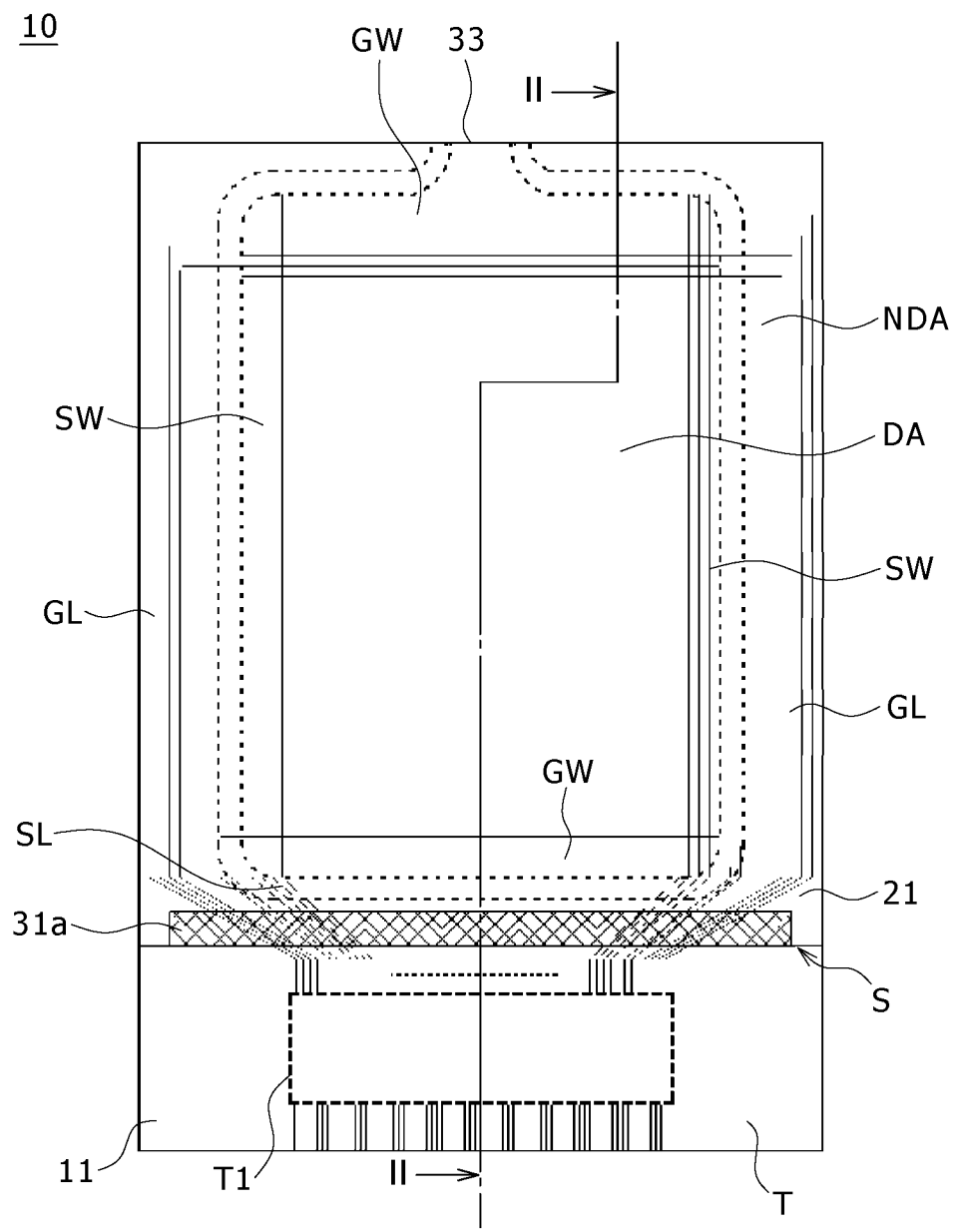
FIG. 1 is a plan view, as seen through a CF (color filter) substrate, of a liquid crystal display panel of an FFS (Fringe Field Switching) mode according to an embodiment.

Embodiments will be described below referring to the drawings. It should be noted here that the embodiment described below is to exemplify a liquid crystal display panel of an FFS mode as an example of the liquid crystal display panel. However, other embodiments included are also applicable in the same way. Incidentally, in each of the drawings used for description in the present specification, for setting each layer and each member to such sizes as to be recognizable on the drawing, the scale is differently adopted on the basis of each layer or each member, so that the layers and members are not presented in proportion to their actual sizes.

Figure 2:
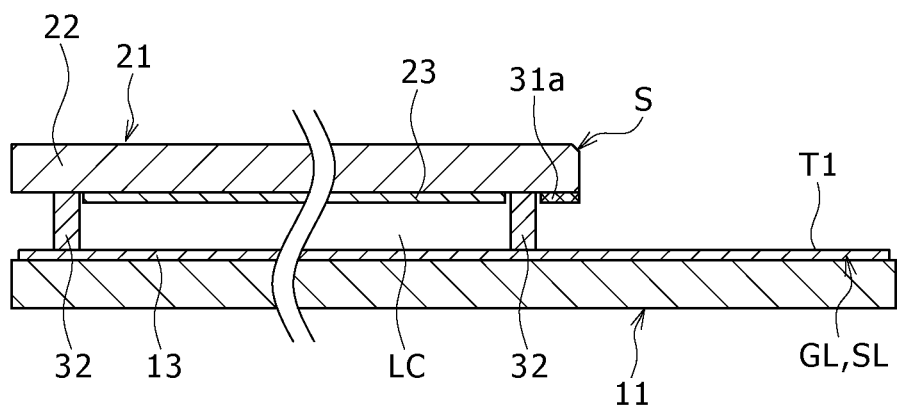
FIG. 2 is a schematic sectional view taken along line II-II of FIG. 1.
Figure 3:
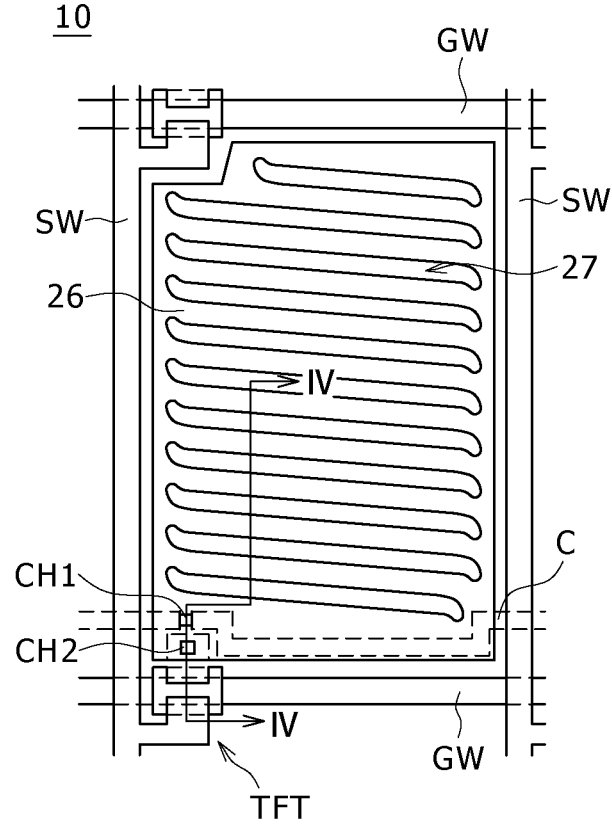
FIG. 3 is an enlarged plan view of one-pixel portion in a display area shown in FIG. 1.
Figure 5A:
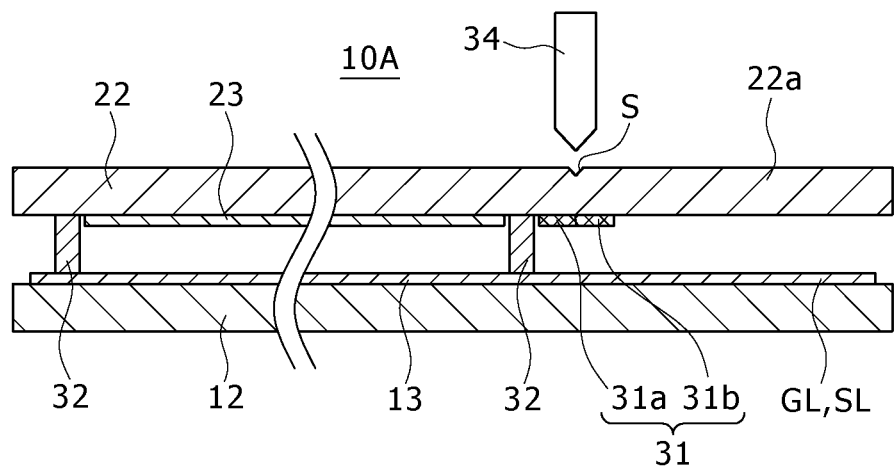
FIG. 5A is a sectional view of a precursor of a liquid crystal display panel before scribing, which is formed with a cut of scribe line in a scribing step.
Figure 5B:
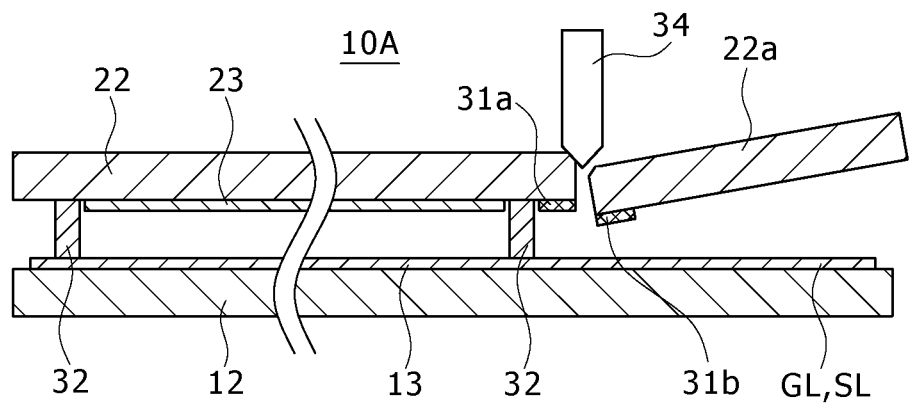
FIG. 5B is a sectional view of the precursor of the liquid crystal display panel immediately after breaking of an end material off from the scribe line by a dividing bar in the scribing step.
Figure 5C:
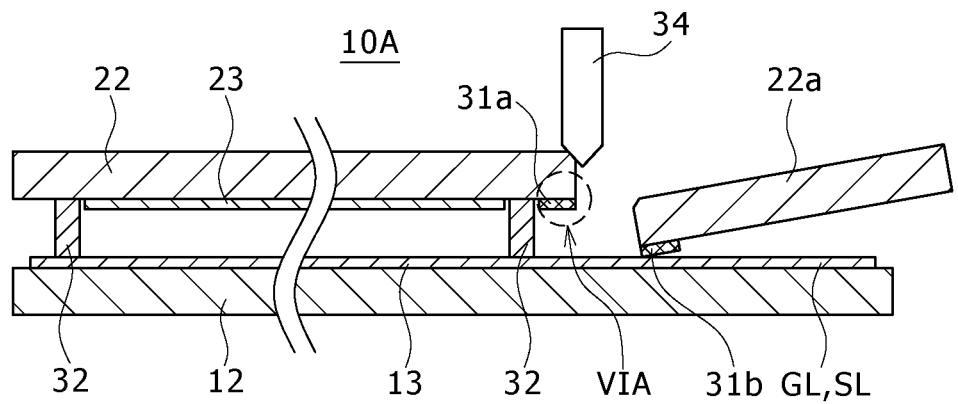
FIG. 5C is a sectional view showing the condition where a corner of the scribed end material comes into contact with an array substrate after the breaking in the scribing step.
Figure 6A:
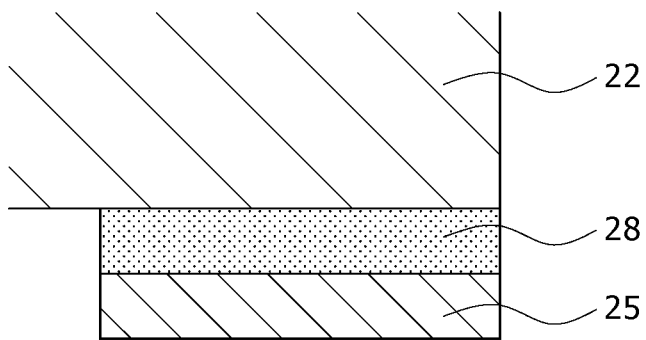
FIG. 6A is an enlarged sectional view of an embodiment of the resin layer at part VIA of FIG. 5B.
Figure 6B:
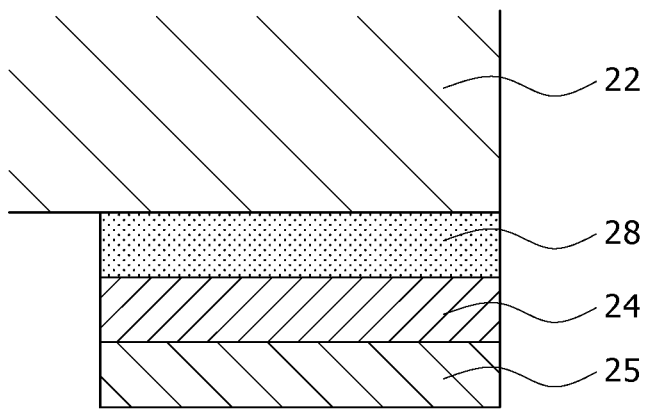
FIG. 6B is an enlarged sectional view of a modification of FIG. 6A.
Figure 6C:
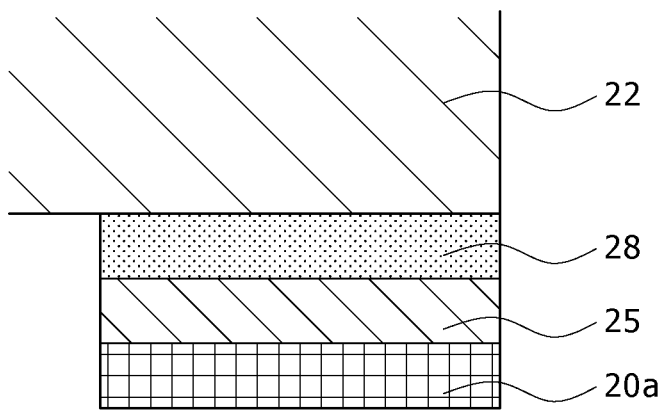
FIG. 6C is an enlarged sectional view of another modification of FIG. 6A.
Figure 7A:
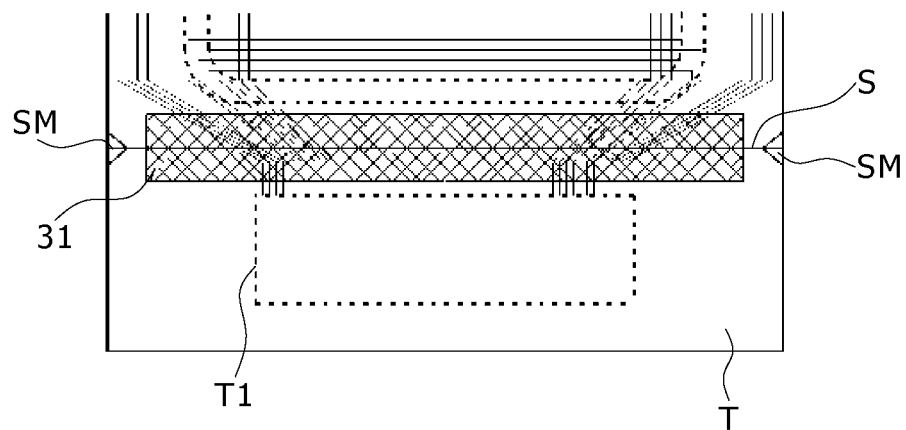
FIG. 7A is a plan view showing the condition where a resin layer is formed according to another embodiment.
Figure 7B:
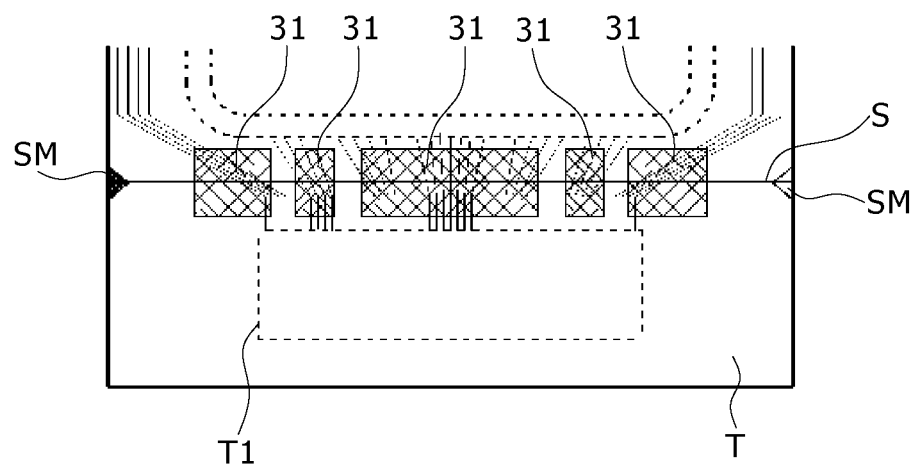
FIG. 7B is a plan view showing the condition where a resin layer is formed according to a further embodiment.
Figure 8:
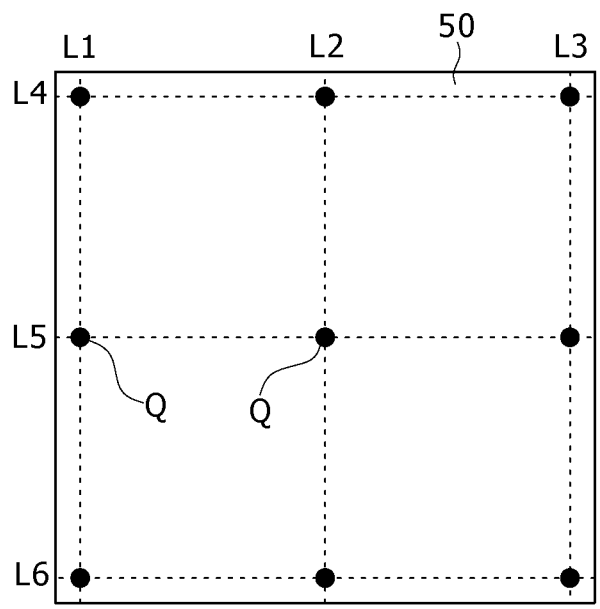
FIG. 8 is a plan view, before scribing, of a substrate and a protective film in a related art.
Figure 9:
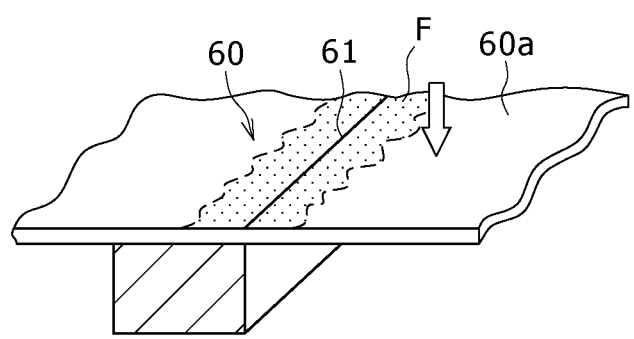
FIG. 9 illustrates a method of scribing a sheet glass according to another related art.
Figure 10A:
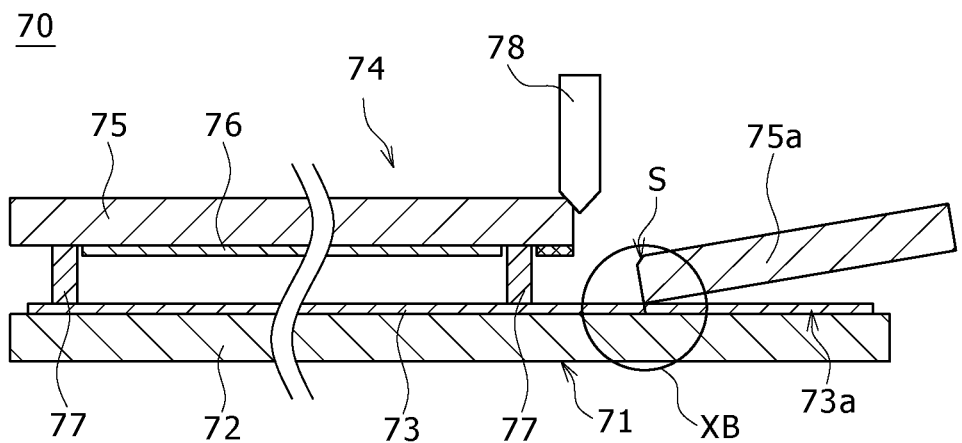
FIG. 10A is a sectional view for illustrating a scribing step according to the related art.
Figure 10B:
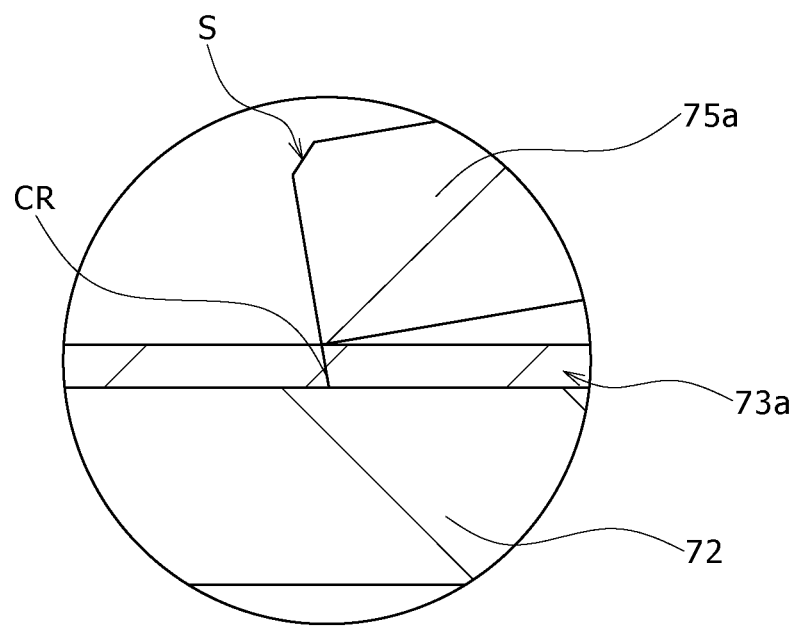
FIG. 10B is an enlarged view of part XB of FIG. 10A.

FIG. 1 is a plan view, as seen through a CF substrate, of a liquid crystal display panel of an FFS mode according to an embodiment. FIG. 2 is a schematic sectional view taken along line II-II of FIG. 1. FIG. 3 is an enlarged plan view of one-pixel portion in a display area shown in FIG. 1. FIG. 4 is an enlarged sectional view taken along line IV-IV of FIG. 3. FIG. 5A is a sectional view of a precursor of a liquid crystal display panel before scribing, which is formed with a cut of scribe line in a scribing step, FIG. 5B is a sectional view of the precursor of the liquid crystal display panel immediately after breaking of an end material off from the scribe line by a dividing bar in the scribing step, and FIG. 5C is a sectional view showing the condition where a corner of the scribed end material comes into contact with an array substrate after the breaking in the scribing step. FIG. 6A is an enlarged sectional view of an embodiment of the resin layer at part VIA of FIG. 5B, FIG. 6B is an enlarged sectional view of a modification of FIG. 6A, and FIG. 6C is an enlarged sectional view of another modification of FIG. 6A. FIG. 7A is a plan view showing the condition where a resin layer is formed according to another embodiment, and FIG. 7B is a plan view showing the condition where a resin layer is formed according to a further embodiment.

First, referring to FIGS. 1 to 5, a liquid crystal display panel of an FFS mode, and a manufacturing method therefor, according to an embodiment will be described. The liquid crystal display panel 10 has roughly rectangular substrates formed of transparent material and facing each other, for example, an array substrate 11 and a color filter substrate 21 which are each composed of a glass substrate. The array substrate 11 corresponds to a first substrate in the present invention, and the color filter substrate 21 corresponds to a second substrate in the invention. The array substrate 11 and the color filter substrate 21 are provided, on their surfaces on the sides of facing each other, various electrodes and wires as well as a color filter layer or the like. In FIG. 2, these wires and the like are shown as structures 13 and 23, respectively.

As shown in FIGS. 1 and 2, the liquid crystal display panel 10 has a configuration in which either one of the array substrate 11 and the color filter substrate 21 is coated with a seal material 32 on the outer peripheral side thereof, the substrates 11 and 21 are adhered to each other so as to form a space with a predetermined size in the inside, and a liquid crystal LC is enclosed inside the space. After the array substrate 11 and the color filter substrate 21 are adhered to each other, the color filter substrate 21 is scribed along a scribe line S provided on the color filter substrate 21, whereby a terminal area T on the array substrate 11 is exposed, and the liquid crystal display panel 10 is completed. Of the liquid crystal display panel 10, the part where the liquid crystal LC is enclosed is a display area DA, while the part surrounding the display area DA is a non-display area NDA. Pluralities of peripheral circuit wires GL and SL are disposed in the non-display area NDA. Of the peripheral circuit wires GL and SL, one-side ends are connected to gate wires GW and source wires SW in the display area DA, and the other-side ends are extended into a driver mounting area T1 in the terminal area T.

The liquid crystal display panel 10 is fabricated from a large-sized mother glass substrate for the array substrates and a large-sized mother glass substrate for the color filter substrates (the large-sized mother glass substrates will each hereinafter be referred to simply as "mother substrate"). Specifically, first, the large-sized mother substrates are provided with predetermined electrodes, wires, a color filter layer, a resin layer, etc. to form individual liquid crystal display panel areas on the mother substrates, and a seal material 32 is applied on the basis of each of the liquid crystal display panel areas. Thereafter, both the mother substrates are adhered to each other so that inside spaces having a predetermined size are formed on the basis of each of the individual liquid crystal display panel areas. Next, the mother substrates thus adhered to each other are split into the individual liquid crystal display panel areas, a liquid crystal is poured into the inside spaces in the individual liquid crystal display panel areas, and liquid crystal pouring ports 33 are sealed off with a sealant, to fabricate the individual liquid crystal display panels.

Thus, the liquid crystal display panels 10 are fabricated by use of the mother substrates. In the following, however, for convenience of description, the manufacturing method will be described in detail regarding one liquid crystal display panel 10 of the FFS mode. In fabricating the array substrate 11 in the liquid crystal display panel 10, first, a conductive layer of, for example, aluminum or an aluminum alloy is formed over the whole surface of a first transparent substrate 12 such as a glass substrate. Thereafter, a plurality of gate wires GW and a plurality of common wires Com are formed in parallel to each other in the display area DA by known photolithography and etching. In this case, simultaneously, the peripheral circuit wires GL and SL are formed.

Next, a gate insulating film 14 composed of a silicon nitride layer or a silicon oxide layer is formed over the whole surface of the assembly. Thereafter, for example, a layer of amorphous silicon (hereinafter referred to as "a-Si") is formed over the whole surface of the gate insulating film 14 by a CVD (chemical vapor deposition) method. Then, a semiconductor layer 16 composed of an a-Si layer is formed in a TFT forming area by known photolithography and etching. The area of the gate wire GW at the position where the semiconductor layer 16 is formed constitutes a gate electrode G of a TFT.

Subsequently, a conductive layer of, for example, aluminum or an aluminum alloy is formed on the surfaces of the gate insulating film 14 and the semiconductor layer 16. Further, the conductive layer is processed by photolithography and etching, to form source wires SW inclusive of source electrodes S intersecting the gate wires GW in the display area DA, and to form drain electrodes D in the TFT forming areas. In this instance, the peripheral circuit wires SL are formed simultaneously. Thereafter, a protective insulating film 15 is formed over the whole surface of the transparent substrate 12 obtained in the above-mentioned step. The protective insulating film 15 may be a silicon nitride layer or a silicon oxide layer.

Next, by photolithography and etching, first contact holes CH1 are formed so as to pierce through the gate insulating film 14 and the protective insulating film 15 over the common wire Com. For the formation of the first contact holes CH1, a plasma etching method, which is a kind of dry etching method, or a wet etching method using buffer hydrofluoric acid can be adopted. By this, the common wire Com is exposed. Incidentally, in this instance, contact holes are not yet formed in the protective insulating film 15 on the upper side of the drain electrodes D. Further, an interlayer film (called also as flattening film) 17 of, for example, an acrylic resin or a polyimide resin is layered on the surface of the protective insulating film 15 in the display area, exclusive of the first contact hole CH1 parts and the planned contact hole forming parts on the upper side of the drain electrodes D, by photolithography.

Subsequently, a transparent conductive layer of, for example, ITO (Indium Tin Oxide) or IZO (Indium Zinc Oxide) is formed over the whole surface of the transparent substrate 12 provided with the interlayer film 17. Thereafter, lower electrodes 18 are formed on the surface of the interlayer film 17 on the basis of each pixel by photolithography and etching. In this instance, the lower electrode 18 for each pixel is electrically connected to the common wire Com through the first contact hole CH1. Therefore, the lower electrodes 18 operate as a common electrode.

Further, an insulating film 19 composed of a silicon nitride layer or a silicon oxide layer is formed over the whole surface of the first transparent substrate 12 provided with the lower electrodes 18. In this case, the surface of the interlayer film 17 in the planned contact hole forming parts over the drain electrodes D is also covered with the insulating film 19. Next, second contact holes CH2 are formed in the interlayer film 17 and the insulating film 19 in the planned contact hole forming parts over the drain electrodes D, by photolithography and etching.

Further, a transparent conductive layer of, for example, ITO or IZO is formed over the whole surface of the first transparent substrate 12 provided with the insulating film 19. Thereafter, upper electrodes 26 formed with a plurality of slits 27 are formed on the surface of the insulating film 19 on the basis of each pixel, by photolithography and etching. The upper electrode 26 is electrically connected to the drain electrode D of TFT at the second contact hole CH2, and operates as a pixel electrode. Thereafter, an orientation film (not shown) is provided over the whole surface inclusive of the upper electrodes 26 in the display area DA, whereby the array substrate 11 of the liquid crystal display panel 10 in this embodiment is completed.

In addition, the color filter substrate 21 has a configuration in which a light-shielding layer 28 is formed on a surface of a second transparent substrate 22 in such a manner as to cover the positions corresponding to the gate wires GW, the source wires SW and TFTs of the array substrate 11. Further, a color filter layer 24 for a predetermined color is formed on the surface of the second transparent substrate 22 surrounded by the light-shielding layer 28. Besides, an overcoat layer 25 is formed so as to cover the surfaces of the light-shielding layer 28 and the color filter layer 24. Then, an orientation film (not shown) is formed on the surface of the overcoat layer 25, to complete the color filter substrate 21. Incidentally, the color filter substrate 21 is formed with photo-spacers 20 at positions, for example, on the upper side of the TFTs of the array substrate 11. The photo-spacers 20 are formed in a predetermined shape by a method in which, photosensitive resin, for example, an acrylic photosensitive agent is applied in a desired film thickness and is then subjected to exposure and development treatments and the like using a predetermined mask. Further, a part where to form a scribe line S of the second transparent substrate 22 of the color filter substrate 21 is formed thereon with a resin layer 31 in such a manner as to straddle the scribe line S (see FIG. 5A). The resin layer 31 has a predetermined width, and is composed of at least one layer of a material selected from among the materials used to form the light-shielding layer 28, the overcoat layer 25, the color filter layer 24 and the photo-spacers 20, so that it can be formed simultaneously with the formation of these layers. Therefore, the resin layer 31 can be formed without adding a special production step for forming the resin layer 31.

Of the array substrate 11 and the color filter substrate 21 produced as above, either one is coated with a seal material 32 in the periphery of the display area DA. Then, the array substrate 11 and the color filter substrate 21 are disposed to face each other so that the upper electrodes 26 of the array substrate 11 and the color filter layer 24 of the color filter substrate 21 face each other, and the substrates 11 and 21 are adhered to each other. In this case, a space with a predetermined size is formed between the array substrate 11 and the color filter substrate 21. In a later step, a liquid crystal LC is poured into the space via a liquid crystal pouring port 33 provided at the seal material 32, and then the liquid crystal pouring port is sealed off, to obtain a precursor 10A (see FIG. 5A) of the liquid crystal display panel.

Next, of the precursor 10A (see FIG. 5A) of the liquid crystal display panel, the second transparent substrate 22 of the color filter substrate 21 is scribed from the scribe line S in a scribing step, and an end material 22a of the second transparent substrate 22 is cut away, to complete the liquid crystal display panel 10. This scribing step is carried out, for example, by a scribing and breaking method. Specifically, first, the outside surface of the second transparent substrate 22 of the color filter substrate 21 is provided with the scribe line S along a planned scribing part (see FIG. 5A). Thereafter, a dividing bar 34 is put in contact with the second transparent substrate 22 along the scribe line S, and the dividing bar 34 is hit from above, to break the end material 22a of the second transparent substrate 22 (see FIG. 5B).

In this instance, a corner of the end material 22a of the second transparent substrate 22 thus scribed may come into contact with the peripheral circuit wires GL and SL of the array substrate 11 (see FIG. 5C). However, a divided resin layer 31b is present on the corner of the end material 22a of the second transparent substrate 22 thus scribed, so that the impact of the contact is absorbed by the divided resin layer 31b. Therefore, breaking of wire can be restrained from occurring at the peripheral circuit wires GL and SL. In addition, on that side of the second transparent substrate 22 of the color filter substrate 21 in the liquid crystal display panel 10 thus manufactured which faces the array substrate 11, a resin layer 31a divided along the break line S is left.

As the resin layer 31a, for example, configurations shown in FIGS. 6A to 6C can be adopted. In the configuration shown in FIG. 6A, the resin layer 31a is composed of the light-shielding layer 28 and the overcoat layer 25. Besides, in the configuration shown in FIG. 6B, the resin layer 31a is formed in a three-layer structure composed of the light-shielding layer 28, the color filter layer 24 and the overcoat layer 25. Further, in the configuration shown in FIG. 6C, the resin layer 31a is formed in a three-layer structure composed of the light-shielding layer 28, the overcoat layer 25 and a layer 20a of the same material as that of the photo-spacers 20. Incidentally, while examples in which the resin layer 31a is composed of two or more layers are shown in FIGS. 6A to 6C, this is for obtaining a thickness necessary for absorption of an impact; therefore, a configuration may be adopted in which the required thickness is offered by only one layer.

In addition, as the shape of the resin layer 31 before the scribing step, various shapes may be adopted according to the design of the first substrate. Now, specific embodiments of the resin layer 31 will be described below referring to FIGS. 7A and 7B. In the embodiment shown in FIG. 7A, the resin layer 31 is so formed that scribe marks SM serving as references for drawing the scribe line S can be visually confirmed from the outside. As a result, the scribe line S can be drawn accurately in a scribing step, and it is possible to obtain a liquid crystal display panel 10 with good dimensional accuracy. On the other hand, in the configuration shown in FIG. 7B, the resin layers 31 are formed, in an individually dispersed state, only at the parts corresponding to the places where the peripheral circuit wires GL and SL of the array substrate 11 are disposed. The embodiment shown in FIG. 7B is adopted mainly in the cases of medium- to large-sized liquid crystal display panels. Specifically, a medium- or large-sized liquid crystal display panel has an ample space of the non-display area, and permits the peripheral circuit wires GL and SL to be disposed in a dispersed state. Therefore, when the resin layers 31 are formed at places corresponding to the wires GL and SL, a predetermined effect can be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display panel comprising:
a first substrate and a second substrate disposed to face each other with a liquid crystal layer held therebetween,
the first substrate having peripheral circuit wires formed in a peripheral area surrounding a display area, and
the second substrate being disposed to face the first substrate so that the peripheral circuit wires of the first substrate are exposed,
wherein a resin layer having a predetermined width is formed on an end part of the second substrate on the side thereof facing the first substrate, the end part overlapping the peripheral circuit wires of the first substrate in plan view, and
wherein a scribe mark serving as a reference for drawing a scribe line is formed on the second substrate, and the resin layer is formed on a portion of the second substrate that overlaps the scribe line and does not overlap the scribe mark in plan view.

2. The liquid crystal display panel according to claim 1, wherein the resin layer comprises at least one layer including a material selected from the group consisting of a material used to form a light-shielding layer, a material used to form an overcoat layer, a material used to form a color filter layer, and a material used to form a photo-spacer.

3. The liquid crystal display panel according to claim 1, wherein the resin layer is formed in a plurality of separate resin layer areas to correspond to areas that include the peripheral circuit wires of the first substrate in plan view.

4. A method of manufacturing a liquid crystal display panel comprising:
preparing a precursor of the liquid crystal display panel which includes a first substrate having peripheral circuit wires formed in a peripheral area surrounding a display area, and a second substrate being disposed to face the first substrate, with a liquid crystal layer held between the first substrate and the second substrate;
forming a scribe mark serving as a reference for drawing a scribe line on the second substrate;
forming a resin layer on the second substrate on a side thereof facing the first substrate and to overlap the peripheral circuit wires in plan view, the resin layer being formed on a portion of the second substrate that overlaps the scribe line and does not overlap the scribe mark in plan view; and
scribing the second substrate along the scribe line so as to expose the peripheral circuit wires of the first substrate.

5. The method of manufacturing a liquid crystal display panel according to claim 4, further comprising:
adhering the first and second substrates to each other with a seal material so that at least a part of the seal material adheres the first and second substrates to each other without the resin layer in between the seal material and the second substrate.

* * * * *